US009436273B2

(12) United States Patent
Itoh

(10) Patent No.: US 9,436,273 B2
(45) Date of Patent: Sep. 6, 2016

(54) INFORMATION PROCESSING DEVICE, METHOD AND COMPUTER-READABLE NON-TRANSITORY RECORDING MEDIUM

(71) Applicant: PFU LIMITED, Kahoku-shi, Ishikawa (JP)

(72) Inventor: Yasunari Itoh, Kahoku (JP)

(73) Assignee: PFU LIMITED, Kahoku-shi (JP)

( * ) Notice: Subject to any disclaimer, the term of this patent is extended or adjusted under 35 U.S.C. 154(b) by 205 days.

(21) Appl. No.: 14/011,340

(22) Filed: Aug. 27, 2013

(65) Prior Publication Data
US 2014/0055349 A1 Feb. 27, 2014

Related U.S. Application Data

(63) Continuation of application No. PCT/JP2011/054546, filed on Feb. 28, 2011.

(51) Int. Cl.
G06F 3/00 (2006.01)
G09G 3/36 (2006.01)

(52) U.S. Cl.
CPC ............. G06F 3/005 (2013.01); G09G 3/36 (2013.01); G09G 2320/028 (2013.01); G09G 2320/068 (2013.01); G09G 2320/0686 (2013.01); G09G 2354/00 (2013.01)

(58) Field of Classification Search
CPC ........ G06F 3/005; G06F 3/01; G06F 1/1686; G09G 2320/068; G09G 2320/0686; G09G 2354/00; G09G 2320/028; G09G 3/36; B60K 2350/2013; B60K 2350/1012; H04N 13/0445
USPC .................... 345/156–174; 715/863
See application file for complete search history.

(56) References Cited

U.S. PATENT DOCUMENTS 6,111,580 A    8/2000    Kazama et al.
6,377,230 B1    4/2002    Yamazaki et al.
(Continued)

FOREIGN PATENT DOCUMENTS

JP    09-081309 A    3/1997
JP    09-101749 A    4/1997
(Continued)

OTHER PUBLICATIONS

International Preliminary Report on Patentability (Form PCT/IB/338) of International Application No. PCT/JP2011/054546 dated Feb. 28, 2011, with Form PCT/IPEA/409. (7 pages).
(Continued)

*Primary Examiner* — Alexander Eisen
*Assistant Examiner* — Abhishek Sarma
(74) *Attorney, Agent, or Firm* — Westerman, Hattori, Daniels & Adrian, LLP

(57) ABSTRACT

An information processing device includes: a user information acquiring unit which acquires position information on a plurality of users in a range from which a directional display device is viewable; a user operation detecting unit which detects a first operation by a first user and a second operation by a second user; a response acquiring unit which acquires a response for notifying a user that an operation has been detected; and a display control unit which causes a response to the first operation be displayed by the directional display device so as to be visible from a position indicated by the position information on the first user and which causes a response to the second operation to be displayed by the directional display device so as to be visible from a position indicated by the position information on the second user.

10 Claims, 9 Drawing Sheets

(56) References Cited

U.S. PATENT DOCUMENTS

| | | | |
|---|---|---|---|
| 2002/0105483 A1 | 8/2002 | Yamazaki et al. | |
| 2006/0279528 A1* | 12/2006 | Schobben et al. | 345/156 |
| 2007/0279319 A1 | 12/2007 | Yamazaki et al. | |
| 2009/0109126 A1 | 4/2009 | Stevenson et al. | |
| 2010/0002079 A1 | 1/2010 | Krijn et al. | |
| 2010/0007796 A1 | 1/2010 | Yamaji et al. | |
| 2010/0328221 A1* | 12/2010 | Happonen | B60K 35/00 345/173 |
| 2011/0298722 A1* | 12/2011 | Tse et al. | 345/173 |
| 2012/0299802 A1 | 11/2012 | Yamazaki et al. | |

FOREIGN PATENT DOCUMENTS

| | | |
|---|---|---|
| JP | 11-331876 A | 11/1999 |
| JP | 2003-076289 A | 3/2003 |
| JP | 2005-073076 A | 3/2005 |
| JP | 2006-522397 A | 9/2006 |
| JP | 2007-47563 A | 2/2007 |
| JP | 2008-097571 A | 4/2008 |
| JP | 2008-197447 A | 8/2008 |
| JP | 2009-500737 A | 1/2009 |
| JP | 2010-20616 A | 1/2010 |

OTHER PUBLICATIONS

Japanese Office Action dated Oct. 21, 2014, issued in Japanese Patent Application No. 2013-502081, w/English translation (5 pages).

Japanese Office Action dated Feb. 4, 2014, issued in Japanese Patent Application No. 2013-502081, w/English translation (7 pages).

International Search Report dated May 31, 2011, issued in corresponding application No. PCT/JP2011/054546.

* cited by examiner

FIG. 7

| USER INFORMATION TABLE | | | |
|---|---|---|---|
| USER IDENTIFICATION INFORMATION | USER POSITION INFORMATION | USER AREA MAP | NON-DISCOVERY COUNTER |
| ... | ... | ... | ... |
| ... | ... | ... | ... |

INFORMATION PROCESSING DEVICE, METHOD AND COMPUTER-READABLE NON-TRANSITORY RECORDING MEDIUM

CROSS-REFERENCE TO RELATED APPLICATION

This application is a continuation application of International Application PCT/JP2011/54546 filed on Feb. 28, 2011 and designated the U.S., the entire contents of which are incorporated herein by reference.

FIELD

The present disclosure relates to an information processing device connected to a display device capable of varying contents made viewable to users according to viewing directions, a method executed by a computer connected to a display device capable of varying contents made viewable to users according to viewing directions, and a program.

BACKGROUND

Conventionally, there is a multiple video display device including: a lens that produces a plurality of viewpoints; first and second liquid crystal elements arranged so as to oppose one end of the lens; first image signal output means for supplying an image signal to the first liquid crystal element; and second image signal output means for supplying an image signal to the second liquid crystal element (refer to Japanese Patent Application Publication No. 2003-76289).

In addition, there is a display device which, by displaying two different images on a display by time division and causing a different image to be recognized for each eyeglass by time division, presents a different image to each person wearing an eyeglass (refer to Japanese Patent Application Publication No. H9-101749).

Furthermore, there is a display system which comprises a multi-view display panel configured so as to display a different image to a different observer in a different direction, which monitors observers, and which diversifies display output based on monitoring information (refer to US Patent Application Publication No. 2010/0002079 (Specification)).

SUMMARY

One aspect of the present disclosure is an information processing device connected to a display device capable of varying contents to be viewed by users according to viewing directions, the information processing device including: a position information acquiring unit to acquire position information indicating positions of a plurality of users in a range from which the display device is viewable; a user operation detecting unit to detect a first operation by a first user among the plurality of users and a second operation by a second user among the plurality of users who differs from the first user; a response acquiring unit to acquire a response for notifying a user that the operation has been detected; and a display control unit to cause a response to the first operation acquired by the response acquiring unit to be displayed by the display device so as to be visible from a position indicated by the position information on the first user and also for causing a response to the second operation acquired by the response acquiring unit to be displayed by the display device so as to be visible from a position indicated by the position information on the second user.

In addition, the present disclosure can also be considered as being a method that is executed by a computer or a program to be executed on a computer. Furthermore, the present disclosure may be embodied by a recording medium which is readable by a device such as a computer, a machine, or the like and on which such a program is recorded. In this case, a recording medium that is readable by a computer or the like refers to a recording medium which accumulates information such as data and programs by an electric action, a magnetic action, an optical action, a mechanical action, or a chemical action and which can be read by a computer or the like.

BRIEF DESCRIPTION OF THE DRAWINGS

FIG. 7 is a diagram showing a configuration of a user information table used in an embodiment;

DESCRIPTION OF EMBODIMENTS

Hereinafter, an embodiment of an information processing device according to of the present disclosure will be described with reference to the drawings. It should be noted that the embodiment described below merely represents an example of implementing the present disclosure and is not intended to limit the present disclosure to the specific configuration described below. When implementing the present disclosure, a specific configuration may be adopted as appropriate in accordance with each embodiment. In the present embodiment, the information processing device according to the present disclosure is implemented as a human interface device provided in an operation object such as an elevator, a car navigation device, an audio device, an information kiosk terminal, a self-checkout terminal, and an electronic appliance. However, an object of application of the present disclosure is not limited to the examples described below, as long as it is a human interface device of an object of operation which may be simultaneously used by a large number of people.

<Configuration of Device>

Figure 1:
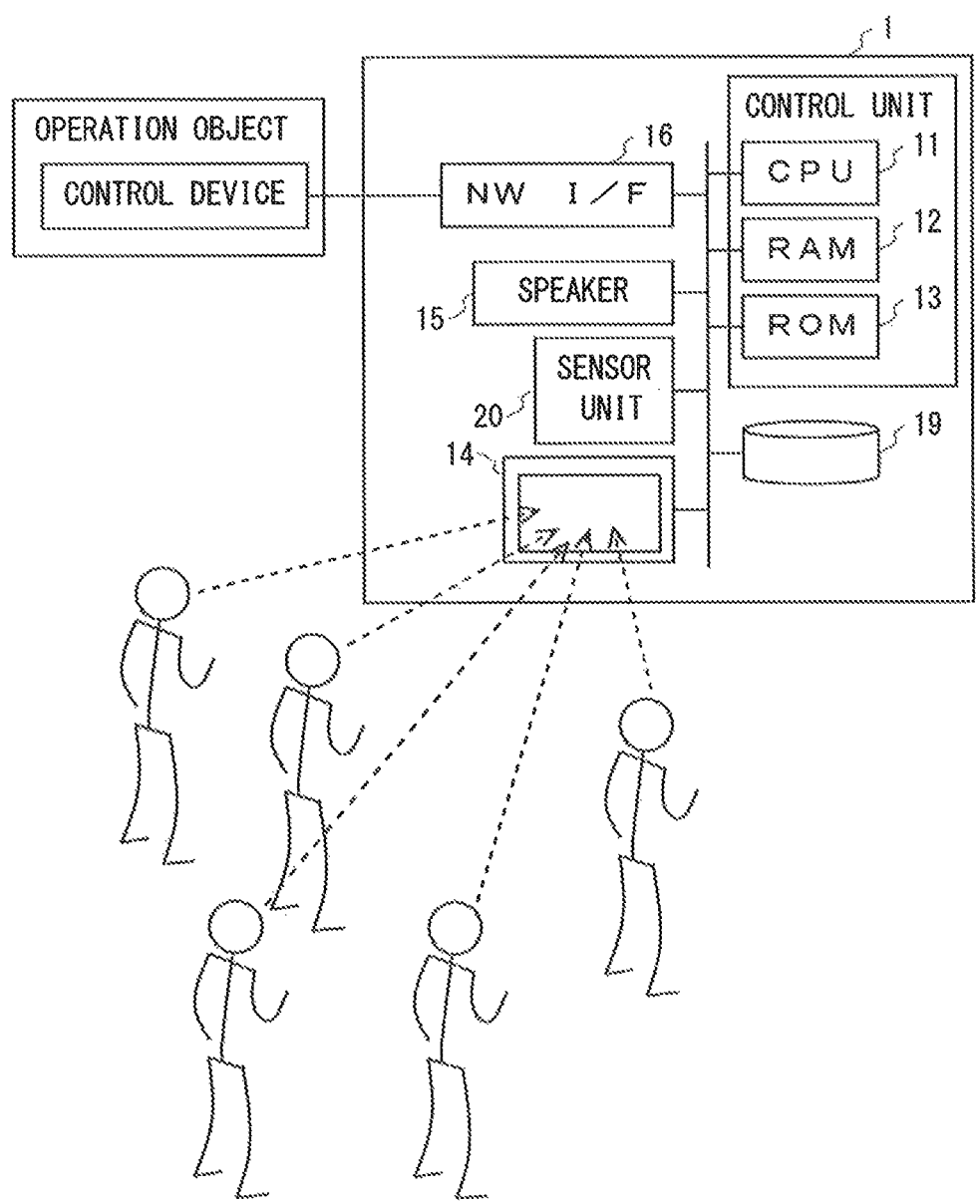
FIG. 1 is a diagram schematically showing a hardware configuration of an information processing device according to an embodiment.

FIG. 1 is a diagram schematically showing a hardware configuration of an information processing device 1 according to the present embodiment. The information processing device 1 is an information processing device to which a central processing unit (CPU) 11, a random access memory (RAM) 12, a read only memory (ROM) 13, an auxiliary storage device 19, a directional display device 14, a speaker 15, a network interface 16, and a sensor unit 20 are electrically connected. In addition, the information processing device 1 is connected to a control device of an object of operation (an elevator or the like) via the network interface 16.

However, when implementing the present disclosure, a device according to the present disclosure need not necessarily comprise all of the components described above. Components may be omitted, replaced, or added as appropriate according to each embodiment in a specific hardware configuration of the device.

The CPU 11 is a central processing unit and controls the respective components of the information processing device 1 including the RAM 12, the auxiliary storage device 19, and an input/output device by processing commands and data deployed on the RAM 12, the ROM 13, and the like. In addition, the RAM 12 is a primary storage device controlled by the CPU 11, and various commands and data are written onto and read from the RAM 12. In other words, the CPU 11, the RAM 12, and the ROM 13 constitute a control unit of the information processing device 1.

The auxiliary storage device 19 is a non-volatile storage device. Information that is desirably retained even after shutting down the information processing device 1 including an operating system (OS) of the information processing device 1 that is loaded onto the RAM 12, various programs for executing the processing presented in the flow charts shown in FIG. 8 and thereafter, and various data to be used by the information processing device 1 are mainly written into and read from the auxiliary storage device 19. For example, an electrically erasable programmable ROM (EEPROM) or a hard disk drive (HDD) can be used as the auxiliary storage device 19.

The directional display device 14 is a directional display device (hereinafter, referred to as a "uniaxial-directional display device" or a "biaxial-directional display device") which enables directional display in a uniaxial direction (for example, a horizontal direction) or a biaxial direction (for example, a horizontal direction and a vertical direction) by varying pixels to be viewed according to directions in which a display unit is viewed using techniques such as a lens with which multiple viewpoints are obtainable (a lenticular lens, a fly-eye lens, or the like) or a parallax barrier. However, a display device that is used as the directional display device 14 can acquire directionality by methods other than the above.

Figure 2:
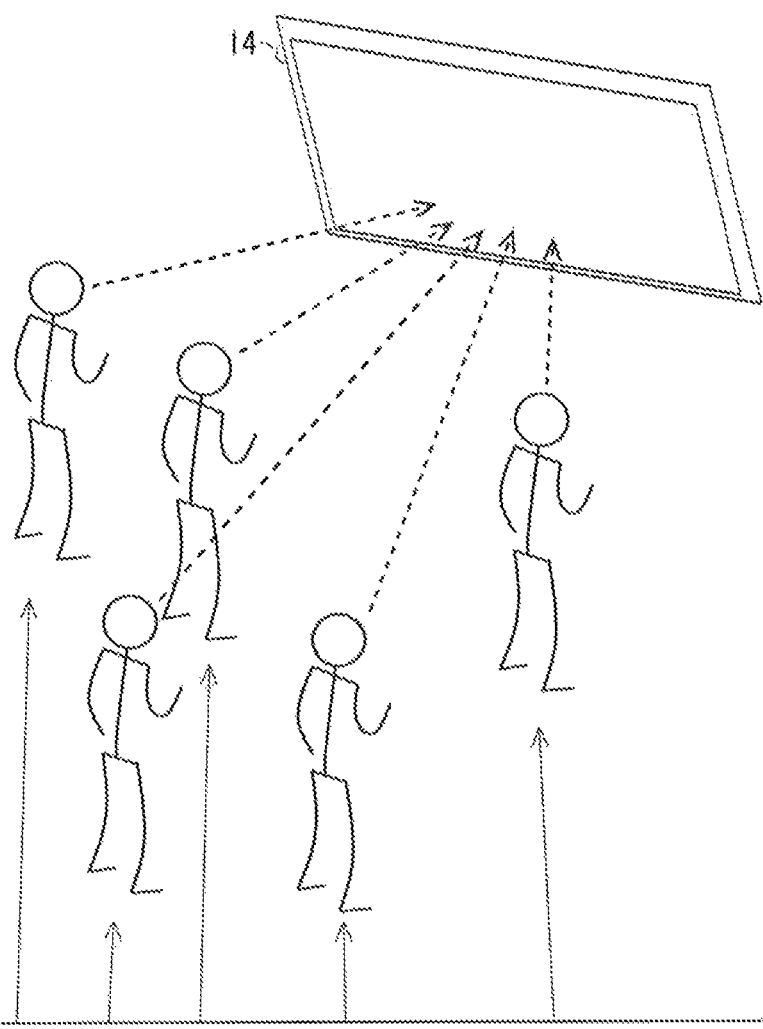
FIG. 2 is a diagram showing how viewed contents differ from one another depending on a position of a user viewing a directional display device according to an embodiment.

FIG. 2 is a diagram showing how viewed contents differ from one another depending on a position of a user viewing the directional display device 14 according to the present embodiment.

With the information processing device 1 according to the present embodiment, the directional display device 14, the speaker 15, the sensor unit 20, and the like are mainly used as input/output devices. Under the control of the CPU 11, by outputting data and accepting operations by a user, the information processing device 1 provides information through the user's five senses and accepts input by the user via a gesture operation made by the user. Contents inputted from the input/output devices are recorded on the RAM 12 and processed by the CPU 11. In addition to input via the sensor unit 20 and output via the directional display device 14, input and output by sound using a microphone (not shown) and the speaker 15 can be used as interfaces.

The sensor unit 20 recognizes a user and acquires information for detecting a gesture made by a user. The sensor unit 20 includes one or a plurality of sensors and adopts a configuration capable of simultaneously recognizing the presence and positions of a plurality of users and simultaneously detecting gestures made by the plurality of users. Hereinafter, examples of specific configurations of the sensor unit 20 will be described.

Figure 3:
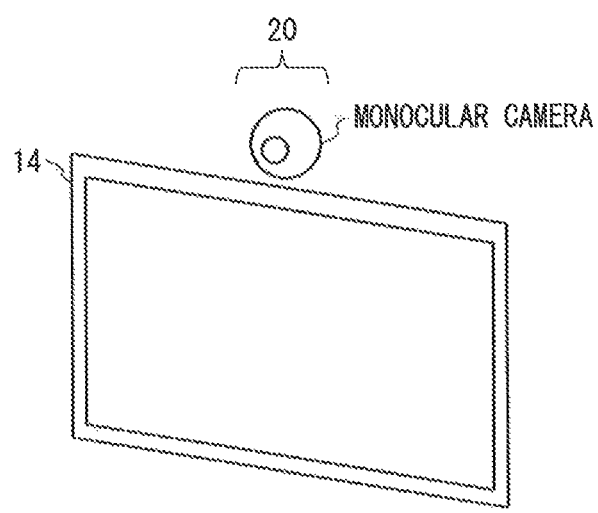
FIG. 3 is a diagram showing an example of a sensor unit arrangement when a sensor unit including a monocular camera is used in an embodiment.

(1) Monocular Camera that Captures Images in at Least One of Visible Light (RGB) and Infrared Light FIG. 3 is a diagram showing an arrangement example of the sensor unit 20 when a sensor unit 20 including a monocular camera that captures images in at least one of visible light (RGB) and infrared light is used according to the present embodiment. Based on image information acquired from the monocular camera, the information processing device 1 is capable of acquiring user position information using image analysis technology including facial recognition technology or using eye gaze recognition technology, detecting a gesture using moving image analysis technology, and the like.

Figure 4:
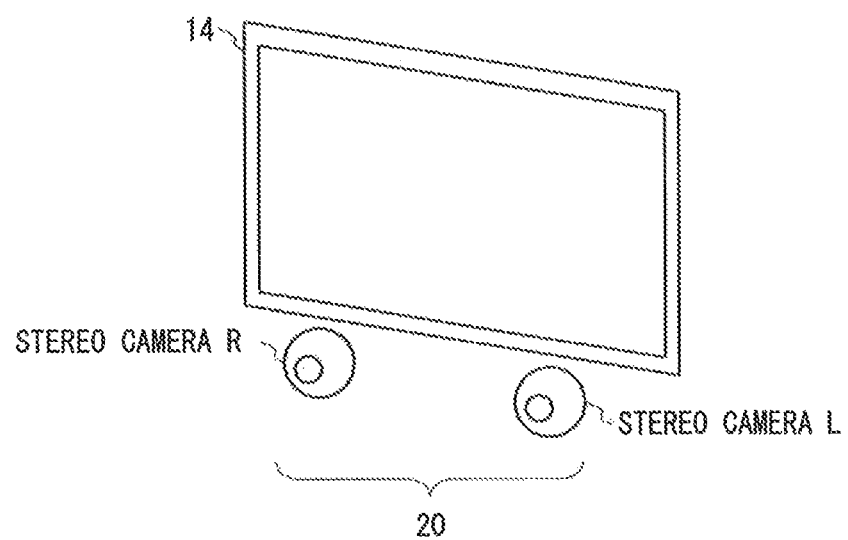
FIG. 4 is a diagram showing an example of a sensor unit arrangement when a sensor unit including a stereo camera is used in an embodiment.

(2) Stereo Camera that Captures Images in at Least One of Visible Light and Infrared Light FIG. 4 is a diagram showing an arrangement example of the sensor unit 20 when a sensor unit 20 including a stereo camera that captures images in at least one of visible light and infrared light is used according to the present embodiment. In addition to comprising functions similar to those of a monocular camera, the sensor unit 20 can be used as a so-called depth sensor by adopting a method (a passive stereo method) in which images captured by the stereo camera are compared and a distance to a subject is calculated based on a parallax. When a depth sensor is used, depth information can be obtained. Depth information is information including a distance (depth) to a captured subject and can be acquired using a passive stereo method, a structured light projection method, a round-trip propagation time method, and the like.

Figure 5:
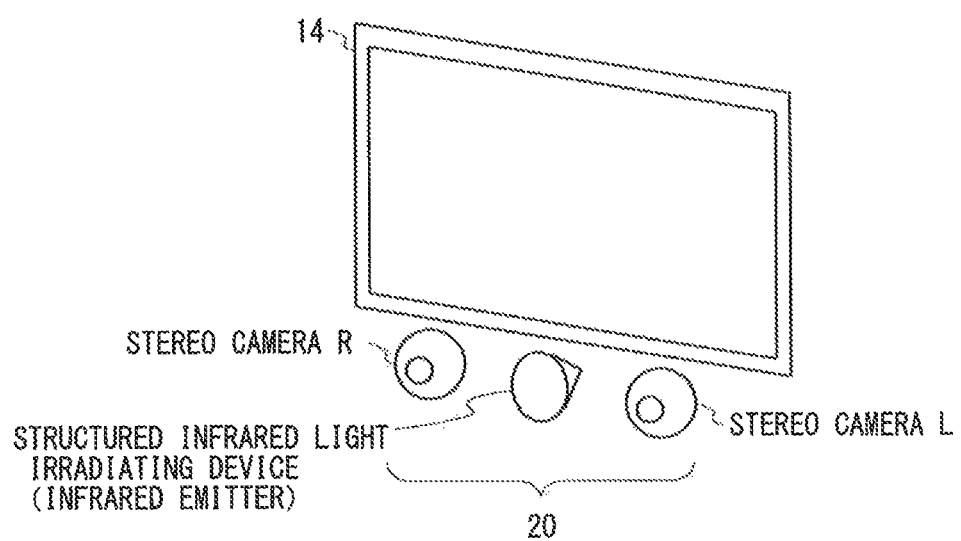
FIG. 5 is a diagram showing an example of a sensor unit arrangement when a sensor unit including a combination of a structured infrared light irradiating device and a camera is used in an embodiment.

(3) Combination of Structured Infrared Light Irradiating Device and Infrared Camera FIG. 5 is a diagram showing an arrangement example of the sensor unit 20 when a sensor unit 20 including a combination of a structured infrared light irradiating device (or an infrared emitter) and an infrared camera is used in the present embodiment. In addition to comprising functions similar to those of a monocular camera, the sensor unit 20 can be used as a so-called depth sensor by adopting a method in which reflected light of structured infrared light that is irradiated from a structured infrared light irradiating device is captured by an infrared camera (a structured light projection method) or a method in which reflected light of an infrared pulse that is irradiated from an infrared emitter is captured by an infrared camera and a time of flight (TOF) of the irradiated infrared pulse is measured (a round-trip propagation time method). Furthermore, eye gaze recognition can also be performed by imaging irradiated infrared light that is reflected off of an eye of a user with a camera and judging whether or not an eye gaze of the user is oriented toward a point of view of imaging of the camera based on the imaging result.

However, even when a structured infrared light irradiating device is used, the sensor unit 20 may further include a visible light camera and a camera capable of imaging visible light in addition to infrared light can be adopted as the camera for imaging reflected light of the infrared pulses. This is because although position information detection and gesture detection can be performed based on images captured by an infrared camera, facial recognition can be performed with higher accuracy when a visible light camera is further provided.

Figure 6:
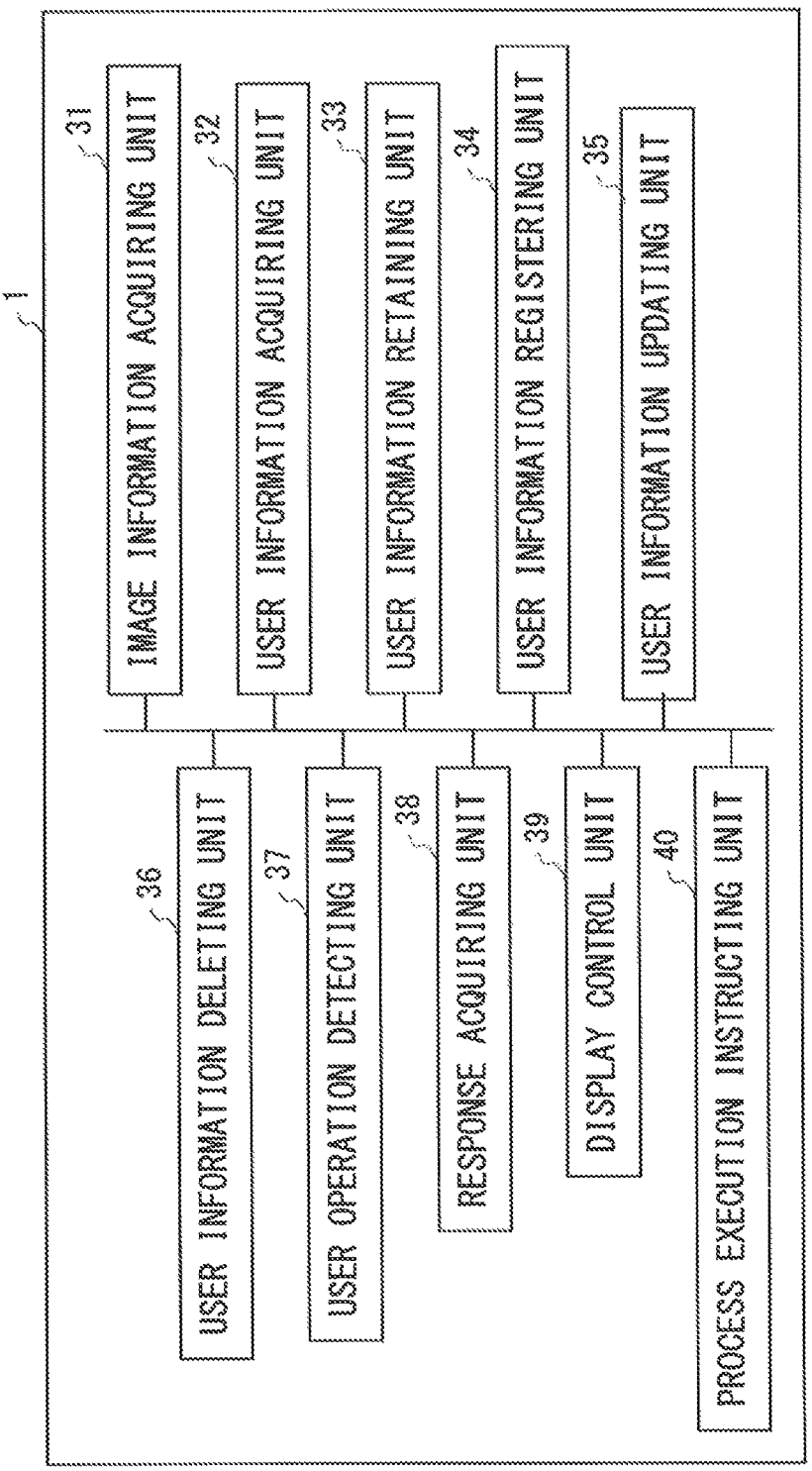
FIG. 6 is a diagram schematically showing a functional configuration of an information processing device according to an embodiment.

FIG. 6 is a diagram schematically showing a functional configuration of the information processing device 1 according to the present embodiment. Due to the CPU 11 interpreting and executing various programs deployed on the RAM 12, the information processing device 1 according to the present embodiment functions as an information processing device 1 comprising an image information acquiring unit 31, a user information acquiring unit 32, a user information retaining unit 33, a user information registering unit 34, a user information updating unit 35, a user information deleting unit 36, a user operation detecting unit 37, a response acquiring unit 38, a display control unit 39, and a process execution instructing unit 40. The respective functional units described above execute functions corresponding to the respective unit that constitute an information processing device according to the present disclosure. In addition, although an example in which all of these functions are executed by a general-purpose CPU 11 is explained in the present embodiment, a part of or all of these functions may be realized by one or a plurality of dedicated processors.

The image information acquiring unit 31 uses the sensor unit 20 to acquire image information including captured images in a range from which the directional display device 14 is viewable. In addition, the image information may include depth information acquired using a sensor unit 20 capable of measuring depths.

The user information acquiring unit 32 acquires user position information that indicates positions of a plurality of users within a range from which the directional display device 14 is visible by analyzing image information. For example, user position information may be acquired by referring to depth information included in image information. Using depth information to acquire user position information enables an anteroposterior relation between users in a depth direction to be readily grasped. Moreover, in the present embodiment, while user position information is to be acquired by analyzing image information, other methods may be adopted for acquiring user position information. For example, user position information may be acquired using a sensor mat installed in a range from which the directional display device 14 is viewable, positional detection using sound waves, and the like.

The user information retaining unit 33 retains user information including user position information acquired by the user information acquiring unit 32 in a user information table on the RAM 12 or the auxiliary storage device 19.

FIG. 7 is a diagram showing a configuration of the user information table used in the present embodiment. User information is information for managing users who are recognized by the information processing device 1 and who exist in a range from which the directional display device 14 is viewable, and is stored in the user information table. User information includes user identification information (user ID), user position information, a user area map, and a non-discovery counter.

When user information related to user position information acquired by the user information acquiring unit 32 is not retained in the user information retaining unit 33, the user information registering unit 34 registers and causes the user information retaining unit 33 to retain user information including the user position information.

When user position information acquired by the user information acquiring unit 32 is retained in the user information retaining unit 33, the user information updating unit 35 updates the user information using the user position information. With the information processing device 1 according to the present disclosure, a user can be tracked and a display direction can be adjusted so as to follow a latest user position by updating user position information.

When the user position information retained by the user information retaining unit 33 has not been updated, the user information deleting unit 36 deletes user information related to the user position information.

The user operation detecting unit 37 detects an operation by a user by detecting, for each user, a predetermined gesture (action) that corresponds to the operation by the user from image information. In other words, the user operation detecting unit 37 detects a first operation (gesture) by a first user included in the plurality of users and a second operation (gesture) by a second user included in the plurality of users who differs from the first user. However, while a case where an operation by a user is performed by a gesture is described in the present embodiment, an operation by a user need not necessarily be a gesture. For example, an operation by a user may be performed using a device operated by the user such as a controller or a mobile terminal device.

In the present embodiment, as predetermined gestures corresponding to operations by users, a start gesture indicating that a user is in a stage prior to making a command gesture, a command gesture indicating an execution command of a predetermined process, and a confirmation gesture indicating whether or not the predetermined process is to be executed are detected. In addition, detection of a command gesture by the user operation detecting unit 37 is performed after a start gesture is detected by the user operation detecting unit 37.

Gesture patterns used for gesture detection are stored in the RAM 12 or the auxiliary storage device 19 in association with contents of operations that are performed by gestures related to the gesture patterns. Favorably, adopted gesture patterns are appropriately set in accordance with attributes of primary users of the information processing device 1, the culture of the territory in which the information processing device 1 is installed, and the like. In this case, contents of operations performed by gestures include a start of a session in the case of start gestures, contents of a command associated with each command gesture in the case of command gestures, and finalization or cancellation in the case of confirmation gestures. In addition, contents of feedback corresponding to the gesture patterns are also stored in the RAM 12 or the auxiliary storage device 19.

(1) Start Gesture

A start gesture is a gesture which is detected by the information processing device 1 in order to grasp that a user is in a stage prior to inputting a desired command and which indicates a start of a session. Therefore, a gesture pattern that the user can spontaneously perform in a stage prior to inputting a command may be adopted as a start gesture. For example, when the information processing device 1 clearly indicates, to a user, a direction in which the user is to show a command gesture (for example, a position of a point of view of imaging by the sensor unit 20), the user may often view the position of the point of view of imaging by the sensor unit 20 before making a command gesture. Therefore, by setting the start gesture to "the user establishing eye contact with the position of the point of view of imaging by the sensor unit 20", the information processing device 1 is capable of detecting the start gesture and grasping that the user is in a stage prior to inputting a command without having the user be conscious of the start gesture.

However, an action that is not performed unless consciously made by the user can also be adopted as the start gesture. As such an action, for example, a gesture involving "the user raising a hand toward the point of view of imaging by the sensor unit 20" can be adopted. In this case, when the user does not intend to perform a command, detection of a start gesture can be avoided and the information processing device 1 can be prevented from entering a command accepting state.

Moreover, a judgment that a start operation by the user has been performed may be made when a plurality of gesture patterns is stored as start gestures and any one of the gesture patterns is detected. By setting a plurality of gesture patterns as detection objects, flexibility can be provided to the input of gestures that constitute a stage prior to command input.

(2) Command Gesture

A command gesture is a gesture that indicates a command issued to the information processing device 1 or a command issued to a control device of an operation object (an elevator or the like) via the information processing device 1. With an ordinary information processing device 1, since a plurality of types of commands that can be inputted are prepared, unlike the start gesture, a different gesture pattern is defined for each command. For example, when the information processing device 1 is connected to a control device of an elevator, the gesture pattern may be a gesture made by the user by "holding up number of fingers corresponding to the destination floor" if "specification of destination floor" is included in the command types or a gesture made by the user by "bringing both hands together" if "closing the door" is included in the command types. Moreover, in a similar manner to start gestures, there may be a plurality of gesture patterns corresponding to a same command type.

(3) Confirmation Gesture

A confirmation gesture is a gesture indicating whether or not a process corresponding to a command related to a command gesture is to be executed. Generally, contents of confirmation include finalizing the command and canceling the command. For example, as a gesture pattern whose content is the finalization (OK) of a command, a gesture involving the user giving a nod, a gesture involving the user giving a thumbs-up, or a gesture involving forming a circle using the fingers or arms can be used. In addition, as a gesture pattern whose content is the cancellation of a command, a gesture involving the user shaking his or her head, a gesture involving the user waving a hand side to side, a gesture involving the user giving a thumbs-down, a gesture involving forming a x using the fingers or arms can be used.

The response acquiring unit 38 acquires a feedback (response) for notifying a user that an operation using a gesture has been detected. In this case, feedback refers to a notification made to the user that an operation performed by the user has been detected or contents of such notification.

The display control unit 39 causes the directional display device 14 to display, for each operation, a feedback to the operation acquired by the response acquiring unit 38 so as to be visible from a position indicated by user position information on the user related to the operation. In other words, the display control unit 39 causes the directional display device 14 to display a feedback to a first operation acquired by the response acquiring unit 38 so as to be visible from a position indicated by first user position information and to display a feedback to a second operation acquired by the response acquiring unit 38 so as to be visible from a position indicated by second user position information.

The process execution instructing unit 40 issues an instruction for executing a predetermined process corresponding to a command gesture when a confirmation gesture indicating that the predetermined process is to be executed is detected by the user operation detecting unit 37.

<Flow of Processing>

Hereinafter, a flow of processing according to the present embodiment will be described with reference to the flow charts shown in FIGS. 8 and 9. Moreover, specific contents, a sequence of processing, and the like shown in the flow charts in the present embodiment merely represent one example of implementing the present disclosure. Favorably, specific processing contents, a processing sequence, and the like may be appropriately selected for each embodiment.

Figure 8:
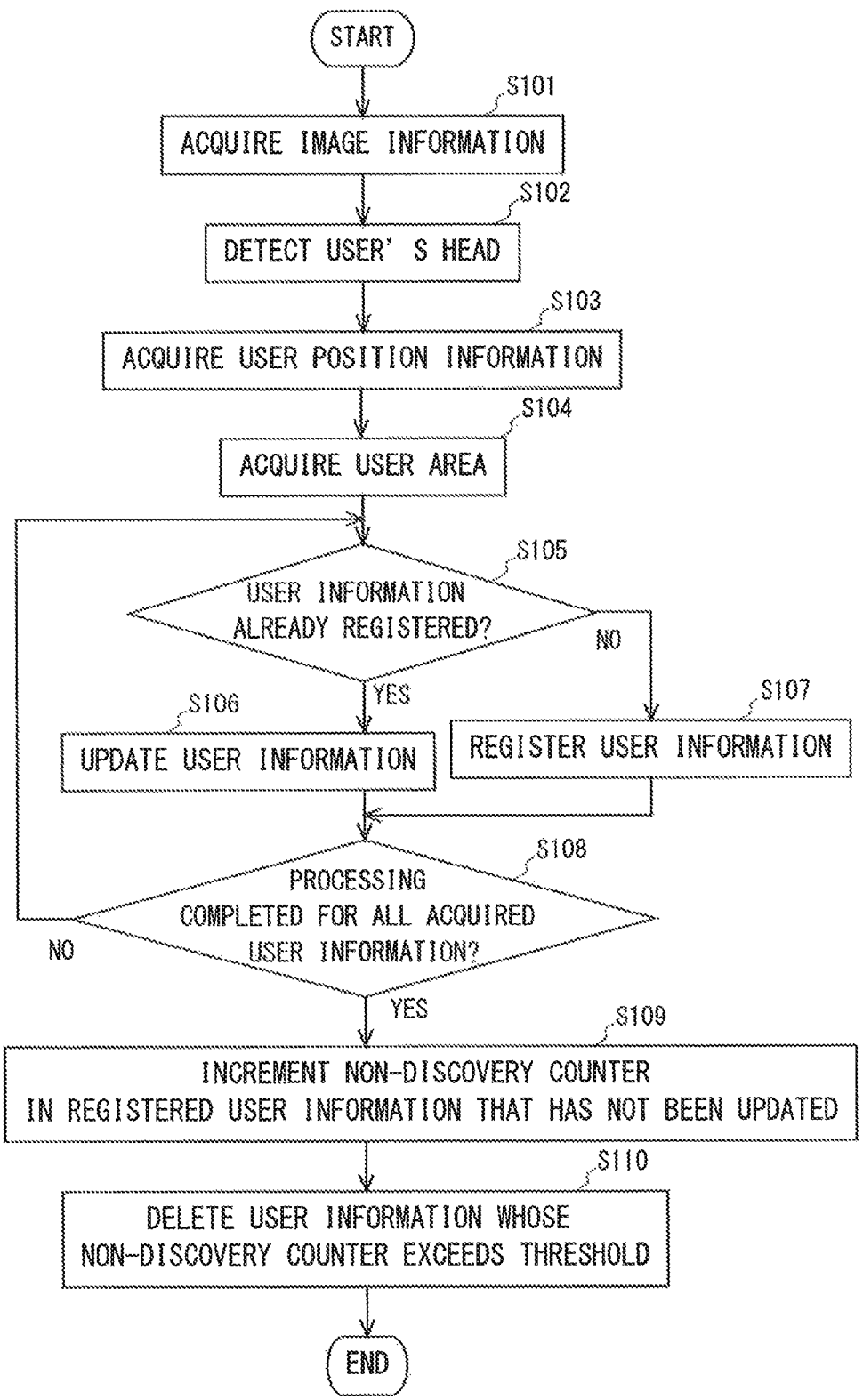
FIG. 8 is a flow chart showing a flow of user information management processing according to an embodiment.

FIG. 8 is a flow chart showing a flow of user information management processing according to the present embodiment. The processing shown in the present flow chart is continuously or periodically executed when the information processing device 1 is running.

In step S101, image information is acquired. The image information acquiring unit 31 acquires image information captured using the sensor unit 20. The image information acquired at this point may be a moving image which corresponds to a predetermined period of time and which has been clipped from a captured moving image or a still image which corresponds to a single frame and which has been clipped from a captured moving image. Whether to use a moving image or a still image as the acquired image information is favorably determined according to a system of image recognition technology adopted in the processing of steps S102 to S104. For example, when a system which detects an object moving inside an image as a user is adopted, image information including a moving image is acquired. In addition, image information acquired at this point may contain depth information indicating a distance (depth) from a point of view of imaging of the sensor unit 20 of each pixel in a captured image. Subsequently, the processing proceeds to step S102.

In step S102, a user's head is detected. Based on the image information acquired in step S101, the user information acquiring unit 32 detects a user's head from an image contained in the image information. For the detection of the user's head, generally-used image analysis technology including facial recognition technology can be used. In addition, image analysis technology of any system may be used. Therefore, a description of details of the detection of the user's head will be omitted. For example, the user information acquiring unit 32 can detect a user's head by retaining a positional relationship between the eyes and the mouth or the like and extracting a feature with the positional relationship from an image.

In addition, when depth information is included in image information, depth information may be used to detect a user's head. Referring to depth information enables a distance (depth) from a point of view of imaging of the sensor unit 20 of each pixel in a captured image to be grasped. As a result, the user information acquiring unit 32 can readily extract a silhouette portion of a user, and by identifying a portion corresponding to the head from the silhouette portion of the user, the user information acquiring unit 32 can detect the user's head.

Once the user's head is detected, the processing proceeds to step S103. Moreover, while a user's head is detected and used as a reference for managing the user's position in the present embodiment, a detection object from image information need only be a portion of the body that can be used as a reference when indicating the user's position and is not limited to the user's head. In addition, eye gaze recognition technology can used to detect a user's head.

In step S103, user position information is acquired. The user information acquiring unit 32 acquires a position of the user's head for all user areas detected in step S102 as user position information. While the user position information acquired at this point may be information indicating a position in an image, the user position information is favorably information indicating a relative position as viewed from a display unit of the directional display device 14 in a space where the user exists. This is because the user position information acquired at this point is to be used when determining a display direction of feedback by the directional display device 14 in user operation recognition processing to be described later. Subsequently, the processing proceeds to step S104.

In step S104, a user area is acquired. Based on the image information acquired in step S101, the user information acquiring unit 32 acquires an area in which the user is captured in the captured image (in other words, the silhouette portion of the user in the captured image). For the detection of a user area, generally-used image analysis technology can be used. In addition, image analysis technology of any system may be used. Therefore, a description of details of the detection of a user area will be omitted. For example, the user information acquiring unit 32 can acquire a user area by retaining a human-shaped silhouette in advance and extracting an edge that approximates the silhouette from an image. The user information acquiring unit 32 generates a user area map by mapping the acquired user area onto information corresponding to the captured image. For example, a user area map is information obtained by mapping pixels on which the user is captured by 1 and mapping pixels on which the user is not captured by 0 on a binary image with the same size as the captured image.

In addition, when depth information is included in image information, depth information may be used to acquire a user area. Referring to depth information enables a distance (depth) from a point of view of imaging of the sensor unit 20 of each pixel in a captured image to be grasped. Therefore, according to depth information, a silhouette portion of a user can be readily extracted as a user area. Once a user area is acquired, the processing proceeds to step S105.

In step S105, a judgment is made as to whether or not user information related to the acquired user position information and the user area map is already registered. The information processing device 1 judges whether or not user information including the user position information acquired in step S103 and the user area map acquired in step S104 is already registered in the user information table. Whether or not acquired user information is already registered can be judged by comparing the acquired user information with user information that has already been registered. More specifically, by calculating a difference between the acquired user information and the user information that has already been registered, user information can be judged to be already registered when the difference is equal to or lower than a predetermined threshold and judged to be unregistered when the difference exceeds the predetermined threshold. When the acquired user information is judged to be already registered, the processing proceeds to step S106. On the other hand, when the acquired user information is judged not to be already registered, the processing proceeds to step S107.

In step S106, user information is updated. The user information updating unit 35 updates user information related to the user by using the user information acquired in steps S103 and S104. As described earlier, the processing shown in the present flow chart is continuously or periodically executed when the information processing device 1 is running. Therefore, the user position information and the user area map included in the user information are updated to latest information in the present step. In addition, in the user operation recognition processing (to be described later), by referring to the user position information and the user area map included in the user information, a gesture is detected from a latest user area and display by the directional display device 14 can be performed so as to be visible from a latest user position. Subsequently, the processing proceeds to step S108.

In step S107, user information is registered. The user information registering unit 34 newly generates user information, includes the user position information acquired in step S103 and the user area map acquired in step S104 in the user information, and registers the user information in the user information table. As described earlier, the processing shown in the present flow chart is continuously or periodically executed when the information processing device 1 is running. Therefore, the user information registered at this point is updated in step S106 as the processing described in the present flow chart is repetitively performed. Subsequently, the processing proceeds to step S108.

In step S108, a judgment is made on whether or not processing has been completed on all acquired user information. The information processing device 1 judges whether updating or registration of all user information acquired in steps S103 and S104 has been completed. When updating or registration of all acquired user information has been completed, the processing proceeds to step S109. When there is user information that has not been updated or registered, the processing proceeds to step S105. In other words, according to the processing shown in the present flow chart, the processing of steps S105 to S108 are repetitively performed until updating or registration of all user information acquired in steps S103 and S104 has been completed.

In step S109, the non-discovery counter is incremented for registered user information that has not been updated. The information processing device 1 identifies, from user information already registered in the user information table, user information not updated in step S106 or, in other words, user information related to a user who had not been detected from image information even though the user information is already registered in the user information table. In addition, the information processing device 1 adds 1 to the non-discovery counter included in the identified user information. The non-discovery counter is reset to 0 (zero) when the user information is newly registered and when the user information is updated. In addition, as described earlier, the processing shown in the present flow chart is continuously or periodically executed when the information processing device 1 is running. In other words, the non-discovery counter is information indicating the number of times a user related to user information is consecutively not detected from image information in the user information management processing shown in the present flow chart. When updating of the non-discovery counter has been completed for all user information that has not been updated, the processing proceeds to step S110.

In step S110, user information whose non-discovery counter exceeds a predetermined threshold is deleted. The user information deleting unit 36 deletes user information whose non-discovery counter exceeds a predetermined threshold (for example, five) from user information already registered in the user information table. Accordingly, user information related to a user who is not detected for a predetermined number of times or more can be deleted from the user information table on the assumption that the user has departed from the imaging range of the sensor unit 20. Subsequently, the processing shown in the present flow chart is completed. However, as described earlier, the processing shown in the present flow chart is continuously or periodically executed when the information processing device 1 is running. Therefore, when the information processing device 1 is running, acquisition of image information, acquisition of user positions, and updating, registration, and deletion of user information are continuously or periodically executed.

Figure 9:
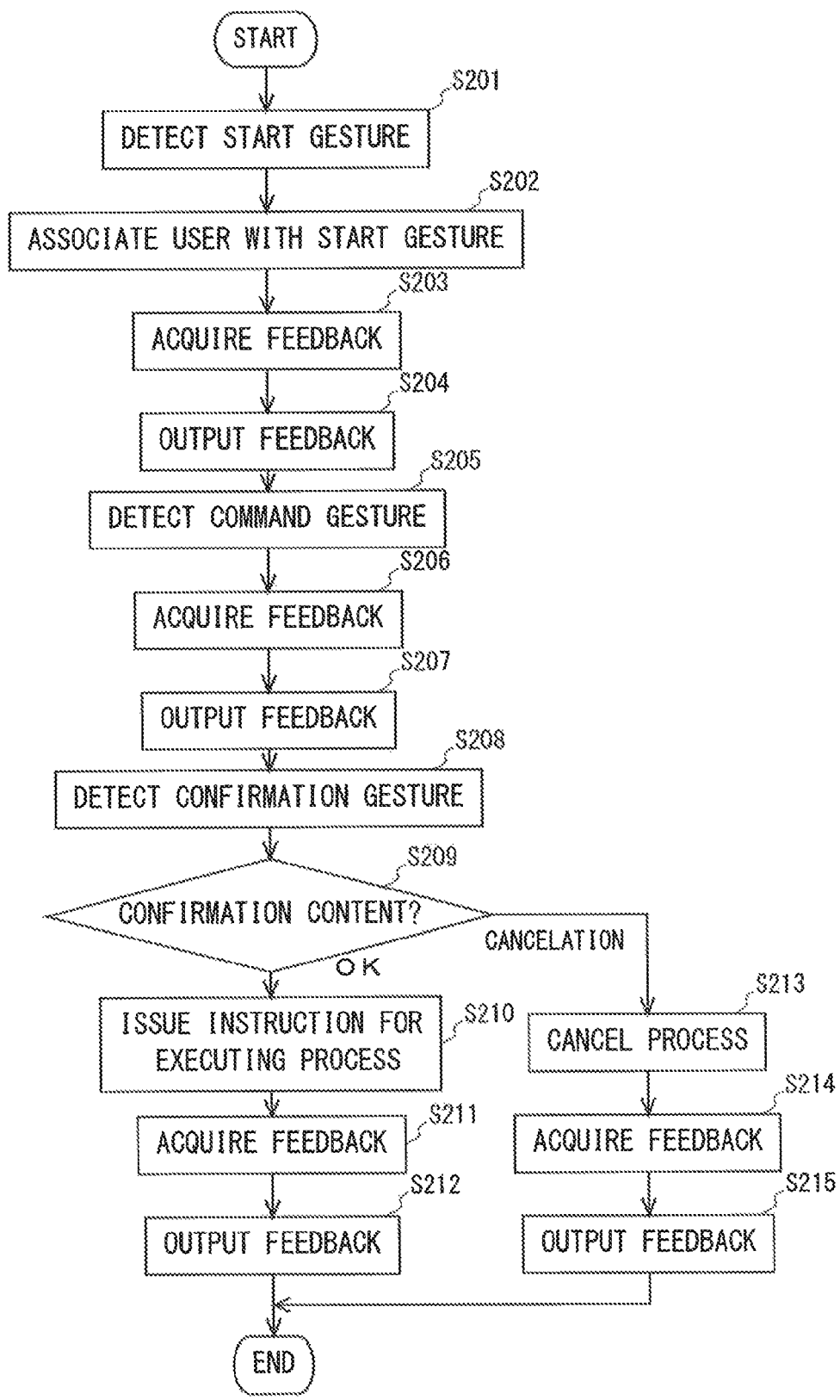
FIG. 9 is a flow chart showing a flow of user operation recognition processing according to an embodiment.

FIG. 9 is a flow chart showing a flow of user operation recognition processing according to the present embodiment. The processing shown in the present flow chart is continuously or periodically executed when the information processing device 1 is running.

In step S201, a start gesture is detected. The user operation detecting unit 37 detects a start gesture by sequentially analyzing moving image information which is captured using the sensor unit 20 and which is continuously inputted to the information processing device 1. Among a moving image, an area on the image in which a user who is a detection object of a gesture is captured (a gesture detection object range) can be identified by referring to a user area map included in the user information registered in step S107 in FIG. 8.

A gesture can be detected by generally-used moving image analysis technology, and gesture detection technology of any system may be used. Therefore, a description of details of gesture detection will be omitted. An example of a gesture detection method is a method in which positions of the head and hands of a user in a moving image are recognized based on a user area map (a silhouette portion of the user) and a variation in a relative positional relationship between the head and the hands is checked against a gesture pattern defined in advance in order to detect a gesture related to the movement of the hands of the user. Depth information is used to recognize a silhouette or positions of the head and hands of a user. In addition, when a gesture is related to an eye gaze instead of a movement of the hands of the user, the eye gaze recognition technology described earlier can be used to detect a gesture such as "the user establishing eye contact with a position of a point of view of imaging by the sensor unit 20". Once a gesture is detected, the processing proceeds to step S202.

In step S202, the gesture and the user having made the gesture are associated with one another. The information processing device 1 identifies the user having made the gesture by acquiring user identification information (user ID) from user information related to user position information or a user area map which had been used to identify a gesture detection object in step S201, and associates the identified user with the detected gesture. Once the processing of the present step is completed, the information processing device 1 enters a standby mode for input of a command gesture from the user. Subsequently, the processing proceeds to step S203. The processing of step S203 and thereafter are multi-threaded for each identified user.

In step S203, feedback corresponding to the start gesture is acquired. The response acquiring unit 38 acquires a content of feedback for notifying the user that an input of the start gesture has been detected in step S201 from the RAM 12 or the auxiliary storage device 19. Contents of feedback corresponding to types of gestures are stored in advance in the RAM 12 or the auxiliary storage device 19. Feedback is information that is outputted in order to inform the user that the gesture made by the user has been detected by the information processing device 1.

However, since the feedback acquired in the present step is a feedback to a start gesture, the feedback may not only indicate that a start gesture has been detected but may also double as a prompt to have the user input a command (command gesture). For example, the feedback acquired at this point may be a message, an icon, a still image, a moving image, or the like that prompts the user to input a command. Examples of a message that prompts the user to input a command include "Please input command", "Please specify destination floor", and the like. Subsequently, the processing proceeds to step S204.

In step S204, the feedback corresponding to the start gesture is outputted. In order to notify the user that the start gesture has been detected in step S201, the display control unit 39 causes the content of the feedback acquired in step S203 to be displayed by the directional display device 14. In this case, the information processing device 1 acquires user position information from user information on the user related to the start gesture. In addition, the display control unit 39 causes the directional display device 14 to display the feedback so as to be visible from the user position indicated in the acquired user position information.

Specifically, based on a relative positional relationship between the display unit of the directional display device 14 and the user position indicated in the user position information, the display control unit 39 calculates a direction (an angle) of the user relative to a display surface of the display unit of the directional display device 14. In addition, the display control unit 39 outputs feedback to the user with the calculated direction as a display direction. Subsequently, the processing proceeds to step S205.

In step S205, a command gesture is detected. The user operation detecting unit 37 detects a command gesture by analyzing image information captured using the sensor unit 20. The user operation detecting unit 37 identifies which command the gesture made by an action of the user in the moving image relates to by checking the action of the user in the moving image with a plurality of gesture patterns corresponding to a plurality of command types. Since a specific gesture detection method is approximately similar to the detection method described in step S201, a description will be omitted. Once a gesture is detected, the processing proceeds to step S206.

In step S206, feedback corresponding to the command gesture is acquired. The response acquiring unit 38 acquires a content of feedback for notifying the user that an input of the command gesture has been detected in step S205 from the RAM 12 or the auxiliary storage device 19. Contents of feedback corresponding to types of gestures are stored in advance in the RAM 12 or the auxiliary storage device 19. Since the feedback acquired at this point is a feedback to a command gesture, the content of the feedback may be a message, an icon, a still image, a moving image, or the like that notifies the user that a command has been accepted. Examples of a message that notifies the user that a command has been accepted include "Your command is accepted", "We will stop at 3rd floor", and the like.

However, while a single feedback stored in advance in the RAM 12 or the auxiliary storage device 19 need only be acquired when a uniform feedback is to be acquired for all commands, when a different feedback is to be acquired according to a content of an acquired command, the response acquiring unit 38 judges which command the command gesture detected in step S205 relates to. More specifically, the response acquiring unit 38 is capable of judging the content of a command by judging which command a gesture pattern matching or approximating the command gesture detected in step S205 relates to.

In addition, since the feedback acquired in the present step is a feedback to a command gesture, the feedback may not only indicate that a command gesture has been detected but may also double as a confirmation dialog for prompting the user to finalize a command. Examples of a message that doubles as a confirmation dialog includes "Your command has been accepted. Execute?" and "Your destination is the 3rd floor. Proceed?" Subsequently, the processing proceeds to step S207.

In step S207, feedback corresponding to the command gesture is outputted. In order to notify the user that the command gesture has been detected in step S205, the display control unit 39 causes the content of the feedback acquired in step S206 to be displayed by the directional display device 14. At this point, the information processing device 1 acquires user position information from the user information related to the command gesture in a similar manner to the processing of step S204. In addition, the display control unit 39 causes the directional display device 14 to display the feedback so as to be visible from the user position indicated in the acquired user position information. Subsequently, the processing proceeds to step S208.

In steps S208 and S209, a confirmation gesture is detected and a content of the confirmation are judged. The user operation detecting unit 37 detects a confirmation gesture by analyzing image information captured using the sensor unit 20 (step S208). Since a specific gesture detection method is approximately similar to the detection method described in step S201, a description will be omitted. However, unlike the start gesture, a different gesture pattern for each confirmation content is defined for the confirmation gesture. Therefore, the user operation detecting unit 37 identifies which command the gesture made by an action of the user in the moving image relates to by checking the action of the user in the moving image with a plurality of gesture patterns corresponding to a plurality of types of confirmation contents.

Next, the information processing device 1 judges whether the content of the confirmation gesture detected in step S208 is a gesture for finalizing a command or a gesture for canceling a command (step S209). Specifically, the information processing device 1 is able to judge the content of a confirmation gesture by judging whether a gesture pattern matching or approximating a confirmation gesture detected in step S208 is a gesture pattern of any of a gesture for finalizing a command and a gesture for canceling a command. When the content of the confirmation gesture is judged to be a gesture for finalizing a command, the processing proceeds to step S210. On the other hand, when the content of the confirmation gesture is judged to be a gesture for canceling a command, the processing proceeds to step S213.

In step S210, an instruction is issued to execute a process corresponding to the command. In correspondence with the content of the command gesture detected in step S205, the process execution instructing unit 40 issues an instruction to execute a process corresponding to the command to a function executing unit in the information processing device 1 or a control device of an operation object (an elevator or the like) that is connected to the information processing device 1 via the network interface 16. When a command content has already been acquired in step S205, the process execution instructing unit 40 issues an instruction to execute a process corresponding to the command in accordance with the command content acquired in step S205. When a command content has not yet been acquired, the process execution instructing unit 40 judges which command the command gesture detected in step S205 relates to and issues an instruction to execute a process corresponding to the command in accordance with the acquired command content. A method of judging which command a command gesture relates to is as described in step S206. Once an instruction to execute a process corresponding to the command has been issued, the processing proceeds to step S211.

In steps S211 and S212, a result of the command execution instruction is acquired and outputted. The response acquiring unit 38 acquires a result of the command execution instruction issued in step S210 from the object to which the instruction had been issued (the function executing unit in the information processing device 1 or the control device of the operation object) (step S211). In addition, the display control unit 39 causes the directional display device 14 to display the result of the command execution instruction acquired in step S211 as feedback to the command gesture detected in step S205 and the confirmation gesture detected in step S208 (step S212). In this case, the information processing device 1 acquires user position information from user information on the user related to the start gesture. In addition, the display control unit 39 causes the directional display device 14 to display the feedback so as to be visible from the user position indicated in the acquired user position information. Subsequently, the processing shown in the present flow chart is completed.

In step S213, the instruction issued to execute the process corresponding to the command is canceled. When a judgment is made in step S209 that the content of the confirmation gesture is a gesture for canceling the command, the information processing device 1 cancels the execution instruction of the process corresponding to the command detected in step S205. Subsequently, the processing proceeds to step S214.

In step S214, feedback is acquired. The response acquiring unit 38 acquires a content of feedback for notifying the user that an input of a confirmation gesture for instructing the command to be canceled has been detected in step S208 from the RAM 12 or the auxiliary storage device 19. Moreover, the feedback acquired in the present step is feedback to a cancelation gesture and the information processing device 1 subsequently transitions to a command gesture standby mode. Therefore, the feedback acquired in the present step may not only indicate that a cancelation gesture has been detected but may also double as a prompt to have the user input a command (command gesture). For example, the feedback acquired at this point may be a message, an icon, a still image, a moving image, or the like which notifies the user that a command has been canceled and which prompts the user to input a command. Examples of a message that prompts the user to input a command includes "The command has been canceled. Input a command" and "3rd floor has been canceled. Please specify a destination floor". Subsequently, the processing proceeds to step S215.

In step S215, feedback corresponding to the cancelation gesture is outputted. In order to notify the user that the cancelation gesture had been detected in step S208, the display control unit 39 causes the content of the feedback acquired in step S214 to be displayed by the directional display device 14. In this case, the information processing device 1 acquires user position information from user information on the user related to the start gesture. In addition, the display control unit 39 causes the directional display device 14 to display the feedback so as to be visible from the user position indicated in the acquired user position information. Subsequently, the processing shown in the present flow chart is completed.

Moreover, while a confirmation process using a confirmation gesture is adopted in the present embodiment, the confirmation process using a confirmation gesture may be omitted and an instruction to execute a process corresponding to a command may be issued immediately after a command gesture is detected.

In addition, the speaker 15 included in the information processing device 1 may be a directional speaker. By conforming an output direction of acoustics from the directional speaker to a display direction of feedback from the directional display device 14, the information processing device 1 is able to provide both visual and acoustic feedback that differs for each user in response to operations inputted by a plurality of users. The output direction of acoustics from the directional speaker may be determined by referring to user position information in a similar manner to determining the display direction of feedback by the directional display device 14.

<Applications of Information Processing Device>

Hereinafter, specific examples of applying the information processing device 1 according to the present embodiment to various uses will be described. It should be noted that the applications described below are merely examples and objects of application of the present disclosure are not limited to the examples described below.

(1) Elevator

By adopting a control device of an elevator as the control device to which the information processing device 1 according to the present embodiment is connected, the information processing device 1 can be configured as a human interface device for processing an operation for specifying a destination floor of the elevator, an operation for opening or closing the door of the elevator, and the like.

Generally, when riding an elevator, users are dispersed to the front/rear and to the left/right inside the elevator. Therefore, the directional display device 14 is favorably installed at a position in an upper portion inside the elevator which is visible from all passengers of the elevators so that the directional display device 14 is visible from all users. In addition, in order to provide feedback that differs for each user so as to be visible from the users dispersed to the front/rear and to the left/right (in other words, a biaxial direction), a biaxial-directional display device capable of directional display in a biaxial direction is favorably adopted as the directional display device 14. In a similar manner, the sensor unit 20 is favorably installed in an upper portion inside the elevator so as to have a top-down view of the interior of the elevator so that the sensor unit 20 can capture images of all passengers that are dispersed to the front/rear and to the left/right in the elevator.

In addition, the command gesture may be a gesture made by the user involving "holding up number of fingers corresponding to the destination floor" in the case of "specification of destination floor" or a gesture made by the user involving "bringing both hands together" in the case of "closing the door". However, since the users are conceivably in close proximity to each other when riding an elevator, favorably, a gesture pattern with a relatively small action is adopted. For example, the start gesture may involve "the user establishing eye contact with the position of the point of view of imaging by the sensor unit 20" and the confirmation gesture may involve "a gesture of the user nodding" and a "gesture of the user shaking his/her head".

(2) Car Navigation Device/Audio Device

By adopting a control device of a car navigation device/audio device as the control device to which the information processing device 1 according to the present embodiment is connected, the information processing device 1 can be configured as a human interface device for processing a tune selection operation, a volume adjustment operation, a mute operation, and the like of the car navigation device/audio device.

Generally, although users of a car navigation device/audio device are dispersed to the front/rear and to the left/right in a plan view of a space inside a vehicle or a room, the users are arranged in a horizontal direction (in other words, a uniaxial direction) from the perspective of the car navigation device/audio device. Therefore, a uniaxial-directional display device capable of directional display in a uniaxial direction may be adopted as the directional display device 14. Since the users are arranged in a uniaxial direction, feedback that differs for each user can be provided by a uniaxial-directional display device so as to be visible from the users. However, when more flexible control of display directions is desired, a biaxial-directional display device may be adopted.

As command gestures, a gesture made by the user involving "pointing a finger left or right" or "waving a hand left or right" may be adopted in the case of a "tune selection operation", a gesture made by the user involving "pointing a finger up or down" or "waving a hand up or down" may be adopted in the case of a "volume adjustment operation", and a gesture made by the user involving "putting the index finger pointed upward to his/her lips" may be adopted in the case of a "mute operation".

In addition, when the information processing device 1 is configured as a human interface device for a car navigation device/audio device, the information processing device 1 may comprise a directional speaker. Comprising a directional speaker enables different acoustic feedback to be provided for each user. For example, a user using a navigation function of the car navigation device in the driver's seat can be provided with a map display (including a feedback display related to the navigation function) using the directional display device 14 and acoustic output (including feedback acoustic related to the navigation function) related to route guidance using the directional speaker, while a user using a video playback function of the car navigation device in a rear seat can be provided with a video display (including a feedback display related to the video playback function) using the directional display device 14 and acoustic output (including feedback acoustic related to the video playback function) related to the video display using the directional speaker.

(3) Information Kiosk Terminal, Self-Checkout Terminal

By adopting a control device of an information kiosk terminal or a self-checkout terminal as the control device to which the information processing device 1 according to the present embodiment is connected, the information processing device 1 can be configured as a human interface device for processing operations performed on the information kiosk terminal or the self-checkout terminal.

Generally, users of an information kiosk terminal or a self-checkout terminal are arranged in a horizontal direction (in other words, a uniaxial direction) from the perspective of the information kiosk terminal or the self-checkout terminal. Therefore, a uniaxial-directional display device may be adopted as the directional display device 14. However, since users of an information kiosk terminal or a self-checkout terminal may possibly include children, a biaxial-directional display device may be adopted when, for example, it is desirable to provide different feedback so as to be visible from a parent and child using the device at the same time.

(4) Electrical Appliance

In addition, by adopting a control device of an electrical appliance as the control device to which the information processing device 1 according to the present embodiment is connected, the information processing device 1 can be configured as a human interface device for processing operations performed on the electrical appliance.

<Advantageous Effects>

Conventionally, human interface devices are mainly passive and require preparatory actions for a user to perform operations. Examples of such preparatory actions include moving to the front of buttons in an elevator, extending a hand to a mouse from a keyboard, standing in front of an information terminal, and searching for a remote controller. In addition, although there are human interface devices that allow operations from a certain distance such as a gesture recognition camera or an eye gaze recognition device, even such human interface devices require preparatory actions in order to finalize a user who is an operation object. Examples of such preparatory actions include standing in front of a camera or looking into an eye gaze input device for gesture recognition. Furthermore, human interface devices are generally designed for a single user. Therefore, when used by a plurality of users, the users must take turns by having other users in front of the elevator buttons move away, by lining up in front of an information terminal, and the like.

With the information processing device 1 according to the present embodiment, by recognizing users desiring to perform operations from a remote distance and accepting operations from a plurality of users at the same time and providing feedback that differs for each user to the plurality of users in parallel, a man-machine interface is realized which suppresses actions other than actual operations including preparatory actions for users to perform operations.

In addition, with the information processing device 1 according to the present embodiment, when an operation object is operated by a plurality of users, a man-machine interface can be provided which can be operated by a plurality of users without requiring the users to be conscious of areas assigned to them.

What is claimed is:

1. An information processing device connected to a display device capable of varying contents to be viewed by users according to viewing directions, and executing user information management processing and user operation recognition processing, the information processing device comprising:
   a position information acquiring unit to continuously or periodically acquire, regardless of presence or absence of detection of a user operation, position information indicating positions of a plurality of users in a range from which the display device is viewable;
   a user information retaining unit to retain user information including the position information on the users acquired by the position information acquiring unit;
   a user information updating unit to continuously or periodically update the user information by using the position information when the position information acquired by the position information acquiring unit is retained by the user information retaining unit, consequently keep the user information updated regardless of presence or absence of detection of a user operation;
   a user operation detecting unit to detect a first operation by a first user among the plurality of users and a second operation by a second user among the plurality of users who differs from the first user;
   a response acquiring unit to acquire a response for notifying a user that the operation has been detected; and
   a display control unit to calculate a direction of the first user and a direction of the second user relative to a display unit of the display device based on position information of the first user and position information of the second user being included in the user information, and cause a response to the first operation acquired by the response acquiring unit to be displayed by the display device so as to be visible from a position indicated by the position information on the first user, by causing the display device to output the response to the first operation with the direction of the first user as display direction, and also for causing a response to the second operation acquired by the response acquiring unit to be displayed by the display device so as to be visible from a position indicated by the position information on the second user, by causing the display device to output the response to the second operation with the direction of the second user as display direction, wherein
   the user information management processing is continuously or periodically executed by the position information acquiring unit, the user information retaining unit and the user information updating unit regardless of presence or absence of the detection by the user operation detecting unit, and
   the user operation recognition processing is executed by the user operation detecting unit, the response acquiring unit and the display control unit, and executed independently from the user information management processing.

2. The information processing device according to claim 1, further comprising:
   an image information acquiring unit to acquire image information by capturing an image of a range from which the display device is viewable, wherein
   the user operation detecting unit detects an operation by a user by detecting a predetermined action corresponding to the operation by a user from the image information.

3. The information processing device according to claim 2, wherein
   the user operation detecting unit detects a command action indicating an execution command of a predetermined process as the predetermined action, and
   the information processing device further comprises a process execution instructing unit to issue an instruction for executing a predetermined process corresponding to the command action.

4. The information processing device according to claim 3, wherein
   the user operation detecting unit further detects a start action indicating that a user is in a state prior to performing the command action, and
   the detection of the command action by the user operation detecting unit is performed after the start action is detected by the user operation detecting unit.

5. The information processing device according to claim 3, wherein
   the user operation detecting unit further detects a confirmation action indicating whether or not the predetermined process is to be executed, and the process execution instructing unit causes the predetermined process corresponding to the command action to be executed when the confirmation action indicating that the predetermined process is to be executed is detected by the user operation detecting unit.

6. The information processing device according to claim 2, wherein
the position information acquiring unit acquires the position information based on the image information.

7. The information processing device according to claim 1, further comprising:
a user information registering unit to, when user information related to the position information acquired by the position information acquiring unit is not retained by the user information retaining unit, cause the user information retaining unit to retain user information including the position information.

8. The information processing device according to claim 7, further comprising:
a user information deleting unit to, when the position information retained by the user information retaining unit is not updated, delete user information related to the position information.

9. A method in which a computer connected to a display device capable of varying contents to be viewed by users according to viewing directions, and executing user information management processing and user operation recognition processing executes:
continuously or periodically acquiring, regardless of presence or absence of detection of a user operation, position information indicating positions of a plurality of users in a range from which the display device is viewable;
retaining user information including the position information on the users acquired in the acquiring of the position information;
continuously or periodically updating the user information by using the position information when the position information acquired in the acquiring of the position information is retained, consequently keep the user information updated regardless of presence or absence of detection of a user operation;
detecting a first operation by a first user among the plurality of users and a second operation by a second user among the plurality of users who differs from the first user;
acquiring a response for notifying a user that the operation has been detected;
calculating a direction of the first user and a direction of the second user relative to a display unit of the display device based on position information of the first user and position information of the second user being included in the user information; and
causing a response to the first operation acquired in the acquiring of the response to be displayed by the display device so as to be visible from a position indicated by the position information on the first user, by causing the display device to output the response to the first operation with the direction of the first user as display direction, and also causing a response to the second operation acquired in the acquiring of the response to be displayed by the display device so as to be visible from a position indicated by the position information on the second user, by causing the display device to output the response to the second operation with the direction of the second user as display direction, wherein the user information management processing is continuously or periodically executed by the acquiring of the position information, the retaining of the user information and the updating of the user information regardless of presence or absence of the detection by the detecting, and
the user operation recognition processing is executed by the detecting, the acquiring of the response and the calculating, and executed independently from the user information management processing.

10. A computer-readable non-transitory recording medium recorded with a program for causing a computer connected to a display device capable of varying contents which are to be viewed by users according to viewing directions, and executing user information management processing and user operation recognition processing, to function as:
a position information acquiring unit to continuously or periodically acquire, regardless of presence or absence of detection of a user operation, position information indicating positions of a plurality of users in a range from which the display device is viewable;
a user information retaining unit to retain user information including the position information on the users acquired by the position information acquiring unit;
a user information updating unit to continuously or periodically update the user information by using the position information when the position information acquired by the position information acquiring unit is retained by the user information retaining unit, consequently keep the user information updated regardless of presence or absence of detection of a user operation;
a user operation detecting unit to detect a first operation by a first user among the plurality of users and a second operation by a second user among the plurality of users who differs from the first user;
a response acquiring unit to acquire a response for notifying a user that the operation has been detected; and
a display control unit to calculate a direction of the first user and a direction of the second user relative to a display unit of the display device based on position information of the first user and position information of the second user being included in the user information, and cause a response to the first operation acquired by the response acquiring unit to be displayed by the display device so as to be visible from a position indicated by the position information on the first user, by causing the display device to output the response to the first operation with the direction of the first user as display direction, and also causing a response to the second operation acquired by the response acquiring unit to be displayed by the display device so as to be visible from a position indicated by the position information on the second user, by causing the display device to output the response to the second operation with the direction of the second user as display direction, wherein
the user information management processing is continuously or periodically executed by the position information acquiring unit, the user information retaining unit and the user information updating unit regardless of presence or absence of the detection by the user operation detecting unit, and
the user operation recognition processing is executed by the user operation detecting unit, the response acquiring unit and the display control unit, and executed independently from the user information management processing.

\* \* \* \* \*